US008710966B2

(12) United States Patent
Hill (10) Patent No.: US 8,710,966 B2
(45) Date of Patent: Apr. 29, 2014

(54) METHODS AND APPARATUS TO PROVIDE HAPTIC FEEDBACK

(75) Inventor: Thomas Casey Hill, Crystal Lake, IL (US)

(73) Assignee: BlackBerry Limited, Waterloo (CA)

( * ) Notice: Subject to any disclaimer, the term of this patent is extended or adjusted under 35 U.S.C. 154(b) by 325 days.

(21) Appl. No.: 13/036,775

(22) Filed: Feb. 28, 2011

(65) Prior Publication Data

US 2012/0218089 A1 Aug. 30, 2012

(51) Int. Cl.
*H04B 3/36* (2006.01)
*G09B 21/00* (2006.01)
*H04M 3/42* (2006.01)
*G06F 3/01* (2006.01)

(52) U.S. Cl.
USPC ....... 340/407.1; 340/407.2; 340/7.6; 340/4.1; 340/4.12; 340/10.4; 340/539.23; 715/702; 455/414.2; 455/414.3

(58) Field of Classification Search
USPC .................... 340/407.1, 407.2, 7.6, 4.1, 4.12
See application file for complete search history.

(56) References Cited

U.S. PATENT DOCUMENTS

| 7,683,780 B2 | 3/2010 | Reynolds | |
| 7,788,032 B2 * | 8/2010 | Moloney | 701/472 |
| 2005/0060088 A1 * | 3/2005 | Helal et al. | 701/208 |
| 2006/0136630 A1 | 6/2006 | Eid et al. | |
| 2008/0120029 A1 * | 5/2008 | Zelek et al. | 701/213 |
| 2009/0167508 A1 | 7/2009 | Fadell et al. | |
| 2009/0270045 A1 | 10/2009 | Flaherty | |
| 2011/0037712 A1 | 2/2011 | Kim et al. | |

OTHER PUBLICATIONS

European Patent Office, "Extended European Search Report" issued in connection with European patent application No. 11173364.8, Jul. 18, 2012, (8 pages).
Isomursu et al., "Experiences from a Touch-Based interaction and Digitally Enhanced Meal-Delivery Service for the Elderly," Hindawi Publishing Corporation, vol. 2008, Article ID 931701, May 30, 2008, 15 pages.
NFC Forum, Frequently Asked Questions, NFC for Consumers, http://www.nfc-forum.org/resources/faqs#enabled, 2010, 6 pages.
NFC Forum, Essentials for Successful NFC Mobile Ecosystems, http://www.nfc-forum.org/resources/white_papers/NFC_Forum_Mobile_NFC_Ecosystem_White_Paper.pdf, Oct. 2008, 23 pages.
Hardy et al., Touch & Interact: Applied to a Tourist Guide Prototype, 2008, 5 pages.
Canadian Intellectual Property Office, "Office Action" issued in connection with corresponding Canadian Patent Application No: 2,768,200, on Jan. 20, 2014 (4 pages).
European Patent Office, "Examination Report" issued in connection with European Patent Application No. 11173364.8, Dec. 5, 2013, (4 pages).

* cited by examiner

*Primary Examiner* — Donnie Crosland
(74) *Attorney, Agent, or Firm* — Hanley, Flight & Zimmerman LLC (57) ABSTRACT

Methods and apparatus to provide haptic feedback are disclosed. One example method includes receiving a goal condition at a mobile device, requesting information from a host device using a first close-proximity communication, receiving the information at a mobile device using a second close-proximity communication, determining a level of haptic feedback based on the received information and the goal condition, and causing a haptic effect on the mobile device based on the level of haptic feedback. Other implementations are possible.

19 Claims, 6 Drawing Sheets

FIG. 5

METHODS AND APPARATUS TO PROVIDE HAPTIC FEEDBACK

FIELD OF THE DISCLOSURE

This disclosure relates generally to feedback systems and, more particularly, to methods and apparatus to provide haptic feedback.

BACKGROUND

Conventionally, haptic feedback can be used to provide confirmation of an action, such as a completed task, to a user of a device. Haptic feedback can also be used as a substitute for generating a sound, such as an alarm or an incoming phone call.

DETAILED DESCRIPTION

As described below, close-proximity communication systems, such as radio frequency identification (RFID), near-field communications (NFC), and the like, can be used by a mobile device, such as a smartphone, to interoperate with a host device to combine context-sensitive information with different levels of haptic feedback to guide a user to a goal. As used herein, a level of haptic feedback refers to a discrete quantity and/or intensity of haptic feedback that is distinguishable from another level of haptic feedback by a user. For example, levels of haptic feedback may be distinguished by length (e.g., a one second haptic effect vs. a two second haptic effect), intensity (e.g., a strong haptic effect vs. a weak haptic effect), and/or quantity (e.g., a single discrete haptic effect vs. two discrete haptic effects with a brief period of no haptic effect between them).

In one example, a user inputs a goal condition (e.g., target information), such as a desired location within a building (e.g., a store within a mall), into his or her personal mobile device (e.g., a smartphone). At designated locations within the building, the user may place the mobile device near a host device to receive, via NFC, information regarding his or her current location. The mobile device determines the user's location based on the location information received from the host device and translates the relative location into haptic feedback. An example haptic feedback level is based on the user's relative distance to the desired location, where the mobile device generates a higher-level haptic effect as the user gets closer to the desired location and generates a lower-level haptic effect as the user gets farther from the desired location.

In another example, the user places the mobile device near an advertisement, or other information source, where the advertisement is equipped with a host device. The example mobile device requests, via NFC, information from the host device. The example host device returns information in response to the request. In some examples, the information includes a set of instructions to be performed by the mobile device. For example, the instructions may instruct the mobile device on how to process the data and/or to communicate with another server (e.g., via a mobile network) to retrieve updated information. In some examples, the information includes static and/or dynamic data that is processed by the mobile device using default instructions. The mobile device receives the data and/or instructions and processes the data and/or instructions in combination with contextual data, such as the local and/or universal time, date, location of the mobile device, and/or user preferences entered into the mobile device. In the example, the mobile device receives instructions from the host device and executes the instructions to interact with a server. The mobile device then determines a level of haptic feedback based on the interaction, the instructions, and/or contextual information, and generates a haptic effect based on the determined level.

An example method disclosed herein includes receiving a goal condition at a mobile device, requesting information from a host device using a first close-proximity communication, receiving the information at a mobile device using a second close-proximity communication, determining a level of haptic feedback based on the received information and the goal condition, and causing a haptic effect on the mobile device based on the level of haptic feedback.

Figure 1A:
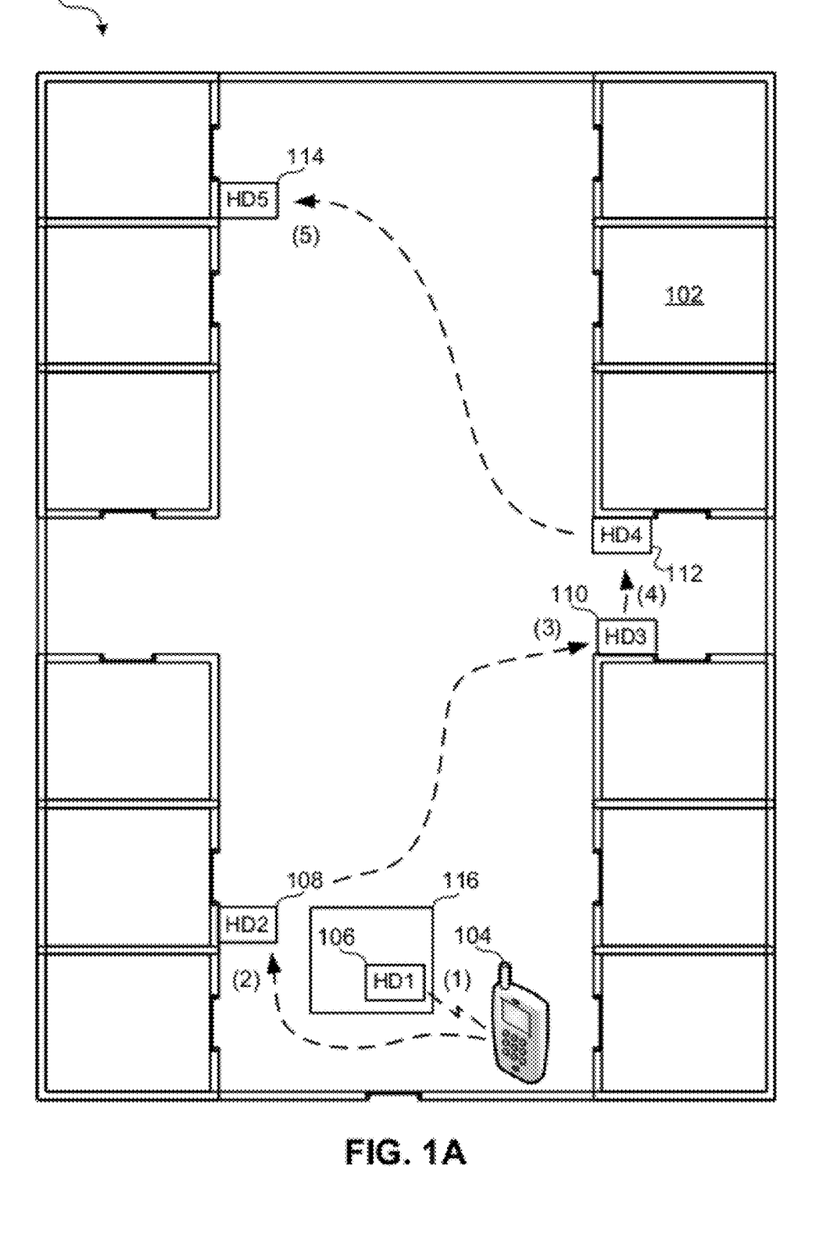
FIG. 1A is a plan view representation of a location in which a user may locate a particular section using haptic feedback provided by a mobile device.

FIG. 1A is a plan view representation of a location 100 in which a user may desire to locate a particular section 102 using context-sensitive haptic feedback provided by a mobile device 104. In some examples, the location 100 is a shopping mall and the section 102 is a particular store within the mall. The example location 100 is provided with several host devices HD1-HD5, which are referred to using reference numerals 106, 108, 110, 112, and 114. A user may utilize the mobile device 104, such as a smartphone, a cellular telephone, or any other suitable device having close-proximity communication functionality, such as NFC, RFID, or any other technology that enables the mobile device 104 to interact with the host devices 106, 108, 110, 112, and 114. Further detail regarding the mobile device 104 and the host devices 106, 108, 110, 112, and 114 is provided below.

In the illustrated example of FIG. 1A, the user of the mobile device 104 desires to travel to the section 102. Upon entering the location 100, the user approaches a kiosk 116 (1) that includes a map of the location 100 and the host device 106. In this example, the user places the mobile device 104 near the host device 106 (e.g., at a visually-designated point on the kiosk 116) and the mobile device 104, upon detecting the host device 106, transmits a request via NFC for information stored on the host device 106. The host device 106 receives the request and transmits data, such as a map of the location 100 and/or a listing of the sections within the location 100 (e.g., a listing of stores in a mall).

In the illustrated example, the user selects a desired store (e.g., section 102) and proceeds to walk through the location 100 to find the store. To assist the user in locating the store, the example mobile device 104 generates context-sensitive haptic feedback. For example, at different locations within the example location 100, host devices 108, 110, 112, and 114 are provided to guide the user based on the selected goal condition (e.g., the selected store, section 102). If at any time the user desires to check how close he or she is from the store, the user may locate one of the host devices 108, 110, 112, and 114 and place the example mobile device 104 near the host device 108, 110, 112, and 114 to receive haptic feedback indicative of his or her relative distance from the section 102. As the user travels closer to the section 102, the example mobile device 104 generates higher levels of haptic feedback (e.g., stronger, more numerous, and/or longer haptic effects) to indicate to the user that he or she is getting closer to the desired store.

In the illustrated example of FIG. 1A, the user of the mobile device 104 moves toward the host device 108 and (2) places the mobile device 104 near the host device 108 to check his location relative to the goal condition. The mobile device 104 requests and receives information from the host device 108 and determines a low level of haptic feedback based on the relatively far distance (with respect to the possible distances from the section 102 from within the location 100) from the mobile device 104 to the section 102. The mobile device 104 then imposes (e.g., generates, causes) the low level of haptic feedback as, for example, a short (e.g., 0.2 second long) vibration of the mobile device 104, which the user understands as meaning he is relatively far from the section 102. While a technique is described by which lower haptic feedback is delivered when the mobile device 104 is relatively far from the goal, other haptic feedback models may be used. For example, the haptic feedback may be higher when the mobile device 104 is farther from the goal. Additionally or alternatively, the haptic feedback may vary in different manne21rs based on distance from the goal. For example, a strong haptic feedback of two slow pulses may be provided when the mobile device 104 is relatively far from the goal, whereas two weak pulses having faster rates may be used when the mobile device 104 is relatively close to the goal.

Continuing with the example, the user then travels through the location 100 to where the host device 110 is located and (3) places the mobile device 104 near the host device 110 to check his location again. The mobile device 104 and the host device 110 interact to determine the location of the mobile device 104 as described above. This time, the mobile device 104 determines that a higher level of haptic feedback than the previous level of haptic feedback is appropriate because the mobile device 104 is closer to the section 102. Therefore, the mobile device 104 imposes an intermediate level of haptic feedback as, for example, a slightly longer haptic effect (e.g., 0.5 second long vibration of the mobile device 104). The user then (4) repeats the location-checking process at the example host device 112, which causes the mobile device 104 to determine a higher level of haptic feedback and impose the higher level as a long haptic effect (e.g., one second long vibration of the mobile device 104). The user of the mobile device 104 interprets the longer haptic effects as getting closer to the selected goal condition.

Continuing with the example, the user travels to the host device 114 and (5) repeats the same process of location-checking The mobile device 104 determines the distance from the section 102, which is farther than the distance to the section 102 from the host device 112. Thus, the mobile device 104 determines a haptic feedback level lower than the level determined at the host device 112, and imposes an intermediate level of haptic feedback as, for example, a haptic effect identical or similar to the haptic effect imposed at the host device 110 (e.g., 0.5 second long vibration of the mobile device 104). The user of the mobile device 104 interprets the shorter haptic effect as getting farther from the selected goal condition than the previous location check at the host device 112. In this way, the mobile device 104 may guide the user to the selected goal condition via the host devices 106, 108, 110, 112, and 114.

Figure 1B:
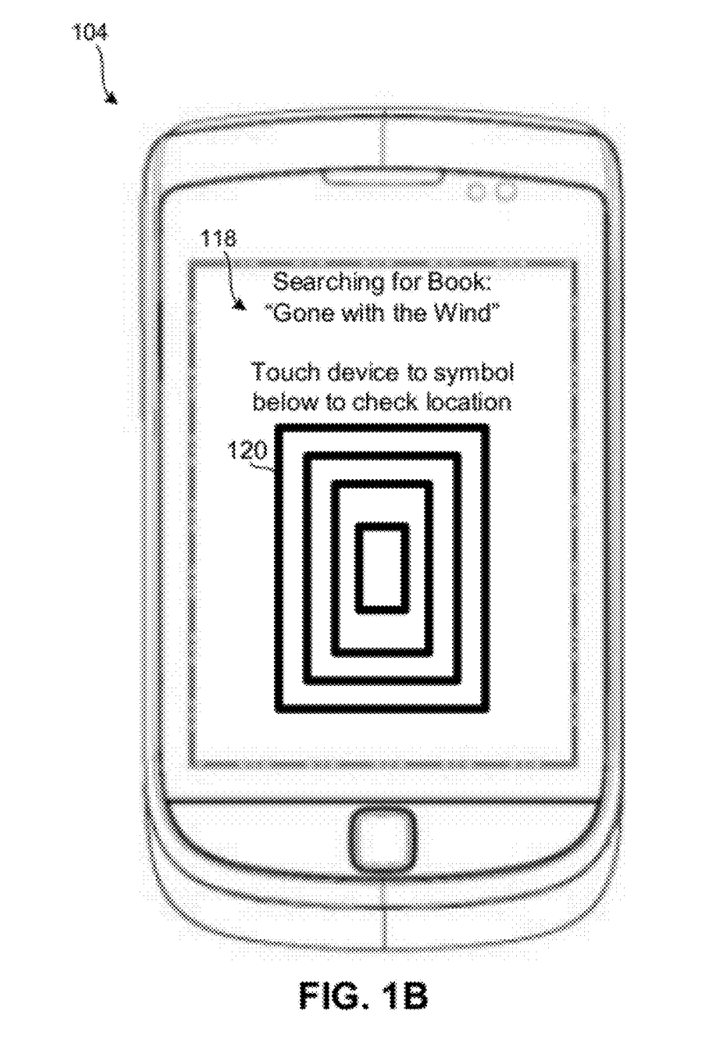
FIG. 1B illustrates the example mobile device of FIG. 1A displaying a user interface to direct the user toward a goal using haptic feedback.

While the illustrated example of FIG. 1A is a simple example discussed with reference to a shopping mall, the example host devices and/or mobile device may be used in other contexts. Another example use of the example mobile device may be to guide the user through library stacks to a desired physical resource (e.g., a particular book, reference, etc.). FIG. 1B illustrates the example mobile device 104 displaying a user interface 118 to direct the user toward a goal using haptic feedback. The illustrated example user interface 118 includes an identification of the desired physical resource (e.g., the book "Gone With the Wind") and a symbol to direct the user to additional host device(s) for location-checking In some examples, a first host device provides instructions to the mobile device 104 to display the user interface 118 and to interact with additional host devices.

In such an example, each book in the library includes a host device. To receive assistance in finding a particular book, the user may place the mobile device 104 near the books as instructed in the example user interface 118. To assist the user, the books in the illustrated example include respective symbols similar to the symbol 120 shown in the user interface 118. The mobile device 104 requests and receives information from the host devices in the books, processes the information, and determines a level of haptic feedback based on the received information and the goal condition (e.g., the desired book). For example, when the mobile device 104 requests information from the host device included in a book, the mobile device 104 may receive data from the host device including one or more of: an identification of the book, a classification of the book (e.g., Dewey decimal number), and/or an expected location of the book (e.g., floor, wing, row, shelf side, shelf height, etc.). The received information is used by the mobile device 104 to identify and/or approximate the user's current location relative to the location of the desired book.

Continuing with the example, the mobile device 104 determines a relative distance from the desired book based on the received information and a level of haptic feedback corresponding to the relative distance. The example mobile device 104 then imposes a haptic effect corresponding to the level of haptic feedback. By repeating this process, the mobile device 104 of the illustrated example may assist the user in locating the book by increasing a level of haptic feedback as the user gets closer to the desired book and decreasing a level of haptic feedback as the user gets farther from the desired book (e.g., similar to the hot-cold game, in which a person is guided to an unknown location or object by simple "hotter" and "colder" cues indicating whether the person is getting closer or farther from the location or object).

In another example of providing haptic feedback to a user of the mobile device 104, the mobile device 104 is used to locate a container (e.g., a box of goods, a package) in a commercial warehouse. To locate the container, the example mobile device 104 requests information from a first host device. The first example host device provides general information to the user (e.g., a map containing the layout and/or organization of the commercial warehouse). The user enters an identifier of the desired container into the mobile device 104, which directs the user toward the container (e.g., by marking the approximate location of the container on a map). As the user traverses the commercial warehouse, the user may place the mobile device 104 near a host device included on containers or places throughout the commercial warehouse to receive information based on the location of the user relative to the desired container. The example mobile device 104 determines a level of haptic feedback based on the received information and imposes a haptic effect based on the determined level.

In another example of providing context-sensitive haptic feedback, the user of the mobile device 104 visits a movie theater that displays advertisement posters for currently-running movies. The example advertisements are each provided with a host device (e.g., the host device 108). When the user places the example mobile device 104 near the example host device 108 (e.g., near a designated location on the advertisement), the host device 108 transmits information including an Internet protocol (IP) address and/or uniform resource locator (URL) of a server (e.g., a dynamic information server) from which the mobile device 104 may retrieve additional information about the advertised movie. The example host device 108 also transmits instructions (or actions) to be executed by the mobile device 104. In some examples, the mobile device 104 receives a goal condition such as "retrieve and present information about the advertisement/product/service/location associated with an NFC tag" when the mobile device 104 detects the host device 106.

Continuing with the example, the mobile device 104 receives the IP address of the server and the instructions from the host device 108. The instructions cause the mobile device 104 to retrieve show time information for the advertised movie from the server at the received IP address. The example mobile device 104 requests the show time information (e.g., the times of the next 3 show times of the advertised movie) from the server at the IP address and the server returns the requested information. In some examples, ticket information (e.g., the number of tickets available, ticket prices, etc.) is also provided with the show time information. The example instructions further cause the mobile device 104 to compare the received show times to the current local time of the mobile device 104 to determine a level of haptic feedback. If, for example, the next show time is less than 15 minutes from the current time, the mobile device 104 determines that a high level of haptic feedback should be used. On the other hand, if the next show time is 15 minutes or more from the current time, the mobile device determines that a lower level of haptic feedback should be used. The mobile device 104 then imposes a haptic effect based on the determined level.

Figure 2:
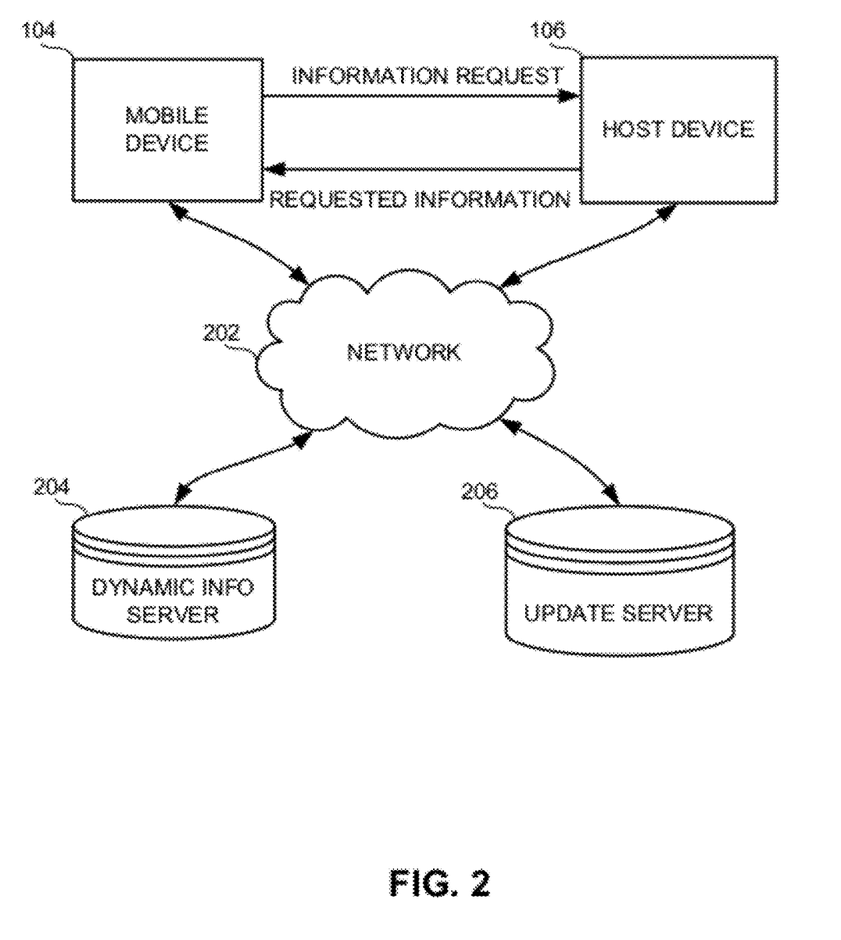
FIG. 2 is a block diagram of an example interaction between a mobile device and a host device to provide haptic feedback.

FIG. 2 is a block diagram of an example interaction between the example mobile device 104 and the example host device 106 of FIG. 1A to provide context-sensitive haptic feedback. The example mobile device 104 and the host device 106 may each be coupled to a network 202, which is further coupled to a dynamic information server 204 and an update server 206.

The mobile device 104 may be a smartphone, a cellular telephone, a tablet computer, a laptop computer, or any other suitable device. The mobile device 104 may exchange information with the host device 106 using any suitable communication technique. For example, the mobile device 104 may transmit a request for information using, for example, NFC, RFID, Bluetooth, wireless fidelity (WIFI), or any other suitable communication technique.

The host device 106 may be an NFC communication device (e.g., an RFID tag) associated with a terminal, a computer, a kiosk, an advertisement, an information display, and/or any suitable configuration that is configured to receive requests for information from the mobile device 104 and to transmit the information in response to the request. The host device 106 of the illustrated example is connected to the network 202, but in some other examples the host device 106 may not be connected to a network.

Information transferred from the host device 106 to the mobile device 104 may be identification information, location information, processing instructions, information servers (e.g., locations from which updated information may be obtained), and/or any other static and/or dynamic information that may be used to guide a user to a goal using haptic feedback. For example, the information provided to the mobile device 104 from the host device 106 may be a location (or expected location) of the host device 106, which may include coordinates within a location (e.g. a floor number within a building). Additionally or alternatively, the information may be additional information provided by the host device 106 to the mobile device 104. The information update may include, but is not limited to, directions or maps of the location 100 or other information related to the building, etc. Another example of information provided by the host device 106 to the mobile device 104 may be an IP address from which current information may be obtained (e.g., a server that provides upcoming movie show times for an advertised movie, weather forecasts for an advertised golf resort, etc.). Such information may be used by the example mobile device 104 in combination with instructions and/or contextual information to provide haptic feedback to a user as disclosed herein.

The network 202 may be implemented using the Internet, a local area network (LAN), a wide network (WAN), or any other network. Additionally, the network 202 may be a collection of networks that collectively form the network 202. The network 202 may be a public or a private network.

The example dynamic information server 204, which is accessible by the network 202, stores and/or updates information related to the host device(s) 106, 108, 110, 112, and 114. When the example mobile device 104 receives information from the host device 106 that includes a location and/or instructions to communicate with the dynamic information server 204, the mobile device 104 communicates an information request to the dynamic information server 204 via the network 202. In some examples, the host device 106 provides an identification of the information to be requested by the mobile device 104 and/or authentication information to be provided by the mobile device 104 to the dynamic information server 204 for authentication. The example mobile device 104 provides the identification to the dynamic information server 204, which may provide dynamic information services for multiple host devices 106, 108, 110, 112, and 114. The example dynamic information server 204 then provides information to the mobile device 104 via the network 202 that may be used to provide haptic feedback to the user as disclosed herein.

The update server 206, which is accessible by the network 202, may be located on a server inside a secure network. The example update server 206 stores information related to the host devices 106, 108, 110, 112, and 114, and periodically and/or aperiodically updates the host devices 106, 108, 110, 112, and 114 via the network 202 with updated information and/or instructions to be provided to the mobile device 104 on request (e.g., when a user places the mobile device 104 within NFC communication range). The example mobile device 104 receives the information and/or instructions, and provides haptic feedback to the user based on the information, instructions, and/or contextual information. The example host devices 106, 108, 110, 112, and 114 are provided with communication devices to communicate with the example update server 206 and to receive updates from the update server 206. For example, a kiosk that includes a host device (e.g., the host device 106) is periodically updated with a new advertisement. The example host device 106 is also updated when the advertisement is changed to provide information and/or instructions to a requesting mobile device that reflects the correct advertisement. A requesting mobile device then uses updated information and/or instructions for the advertisement displayed on the host device 106 (e.g., in combination with contextual information) to provide haptic feedback to the user, which may be different from a haptic feedback provided to user(s) of requesting mobile device(s) for a previous advertisement displayed on the host device 106.

In another example, the update server 206 provides the host device 106 with information and/or instructions based on the location of the host device 106. When the host device 106 and/or an object to which the host device 106 is attached or affixed is placed in a location, the host device 106 may be instructed to request information from the update server 206 based on the location, or the update server 206 may be instructed to provide the specified host device 106 with location information. The host device 106 then provides the location information to a requesting mobile device to, for example, guide a user of the requesting mobile device to a desired resource (e.g., a book in a library, a container or product in a commercial warehouse, etc.) using haptic feedback.

In some examples, the host devices 106, 108, 110, 112, and 114 require secure connections from the update server 206 to allow updating the information on the host devices 106, 108, 110, 112, and 114. The example security requirement prevents unauthorized users from installing unauthorized and/or malicious data and/or instructions on the host devices 106, 108, 110, 112, and 114, which could then be transferred to an unsuspecting user of a mobile device. Such a secure connection may be implemented using a virtual private network (VPN) connection, a public/private key system, or the like.

Figure 3:
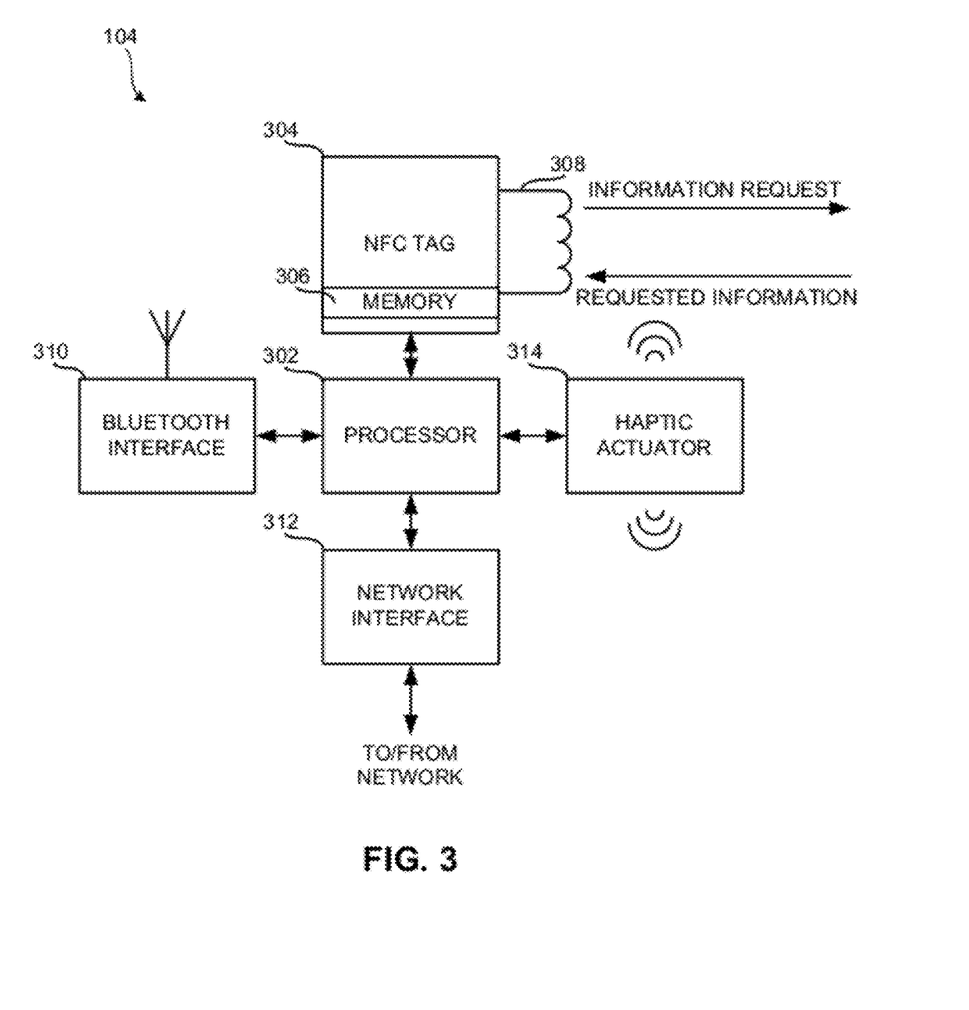
FIG. 3 is a diagram of an example mobile device for use in the system of FIG. 1A and FIG. 2.

Further detail regarding aspects of the mobile device 104 is shown in FIG. 3. The mobile device 104 includes a processor 302 that is connected to a close-proximity communication device, such as an NFC tag 304.

The processor 302 may be implemented using any suitable microcontroller or microprocessor capable of executing instructions. Additionally, the processor 302 may include hardware implementations, such as application-specific integrated circuits (ASIC), programmable logic devices (PLDs), or any other suitable logic device or devices.

The NFC tag 304 includes a memory 306 and an antenna 308. In one example, the NFC tag 304 is implemented according to the International Standards Organization standard ISO 14443. Implementation according to other standards is possible. In some examples, the memory 306 stores information related to the user of the mobile device 104, such as personal information, credentials, authorizations, historical information, etc., that may be transferred to a host device (e.g., the host device 106 of FIGS. 1 and/or 2) with a request for information when the NFC tag 304 is interrogated. In addition, the NFC tag 304 may receive requested information from the host device 106. In the illustrated example, the received information is stored in the memory 306 of the NFC tag 304 for use by the processor 302. Example received information includes static and/or dynamic data, a location (e.g., an IP address, a URL) from which additional information may be retrieved, and/or instructions to be performed by the processor 302. While the close-proximity communication device is described as being a NFC tag 304, other types of close-proximity communication devices may be utilized instead of, or in addition to, the NFC tag 304. For example, the NFC tag 304 may be a NFC-enabled mobile device.

The NFC tag 304 may store information or may store pointers to information that may be retrieved over the network by the processor 302 via a Bluetooth interface 310 or over a network interface 312. In some examples, all the information may be stored across a network, or the NFC tag 304 may store information and may store pointers to information.

The network interface 312 may be implemented using any wired or wireless communication interface. For example, the network interface 312 may be implemented using an Ethernet connection, or any other wired connection. Alternatively, the network interface 312 may be implemented using a WIFI interface, a cellular modem, which may be a second generation (2G) and/or third generation (3G) and/or fourth generation (4G) cellular modem, or the like, and/or any other wireless network interface. In some examples, the processor 302 retrieves information from a server (e.g., from the dynamic information server 204 of FIG. 2) via the network interface 312. Although shown as having a single network interface 312 the mobile device 102 may include several different network interfaces using one or more different wireless access technologies.

The example mobile device 104 further includes a haptic actuator 314. The haptic actuator 314 is in communication with the processor 302 and imposes haptic effects (e.g., vibrations) on the mobile device 104 in response to communications and/or signals from the processor 302. When the processor 302 determines a level of haptic feedback, the processor 302 controls the haptic actuator 314 to impose one or more haptic effects corresponding to the level of haptic feedback. For example, the haptic actuator 314 may impose haptic effects that are distinguishable by intensity or strength (e.g., stronger, weaker, and/or intermediate strength vibrations), length (e.g., longer, shorter, and/or intermediate time vibrations), and/or number (e.g., one or more successive vibrations separated by period(s) of no vibration). The haptic actuator 314 may comprise an unbalanced electric motor, one or more piezoelectric sensors, or any other means of providing haptic feedback.

Block diagrams of apparatus and flowcharts representative of example processes that may be executed to implement some or all of the elements and devices described herein are described below and shown in the drawings. In these examples, the process represented by each flowchart may be implemented by one or more programs comprising machine readable instructions for execution by a processor or controller or any suitable hardware, such as shown in FIGS. 1, 2, and/or 3, and/or any other suitable device.

The one or more programs may be embodied in software or software instructions stored on a tangible medium such as, for example, a flash memory, a CD-ROM, a hard drive, a DVD, or a memory associated with a processor, but the entire program or programs and/or portions thereof could alternatively be executed by a device other than the microprocessor and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example mobile communications system components could be implemented by any combination of software, hardware, and/or firmware. Also, some or all of the processes represented by the flowcharts may be implemented manually. As used herein, the term tangible computer readable medium is expressly defined to include any type of computer readable storage.

Additionally or alternatively, the example processes described herein may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium.

Figure 4:
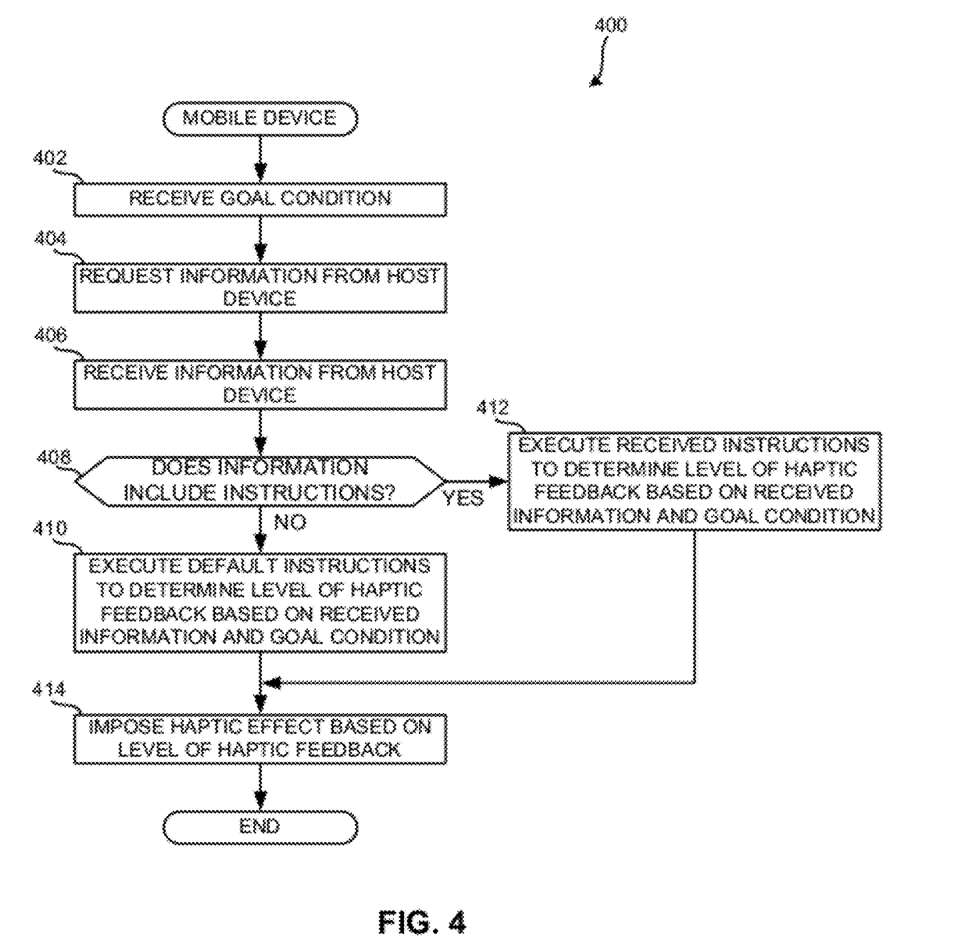
FIG. 4 is a flow diagram of an example process that may be carried out by the mobile device of FIG. 1A, FIG. 2, and FIG. 3.

A process 400, as shown in FIG. 4, may be carried out by a mobile device, such as the mobile device 104 of FIGS. 1, 2, and/or 3. The example process 400 of FIG. 4 will be discussed with reference to the example mobile device 104 of FIG. 3. The mobile device 104, when brought near a host device such as the host device 106 of FIGS. 1, 2, and/or 3, receives a goal condition (block 402). Example goal conditions may include locating a desired object (e.g., a book in a library), traveling to a particular location (e.g., a room in a building), or obtaining information about an object (e.g., obtaining more information about a product displayed on an advertisement). The example goal condition may be received by the mobile device 104, for example, as a selection by a user of a desired item, service, location, or other selection from a list. In some examples, receiving the goal condition occurs when the mobile device 104 is placed near a host device 106, 108, 110, 112, or 114.

The mobile device 104 requests information from a host device (block 404). In some examples, the request occurs via NFC, RFID, and/or another close-proximity communication method. The example request may be an interrogation of the host device 106 by the mobile device 104 instead of a request for specific information, which causes the host device 106 to transmit predetermined data in response. The example mobile device 104 receives the requested information (block 406). In some examples, receiving the information occurs via the same close-proximity communication method as the request of block 404. In some examples, the received information is stored in the memory 306 of the NFC tag 304 in the mobile device 104.

The processor 302 determines whether the information includes instructions (e.g., instructions to be performed by the mobile device 104) (block 408). Example instructions may cause the mobile device 104 to communicate with a server (e.g., the dynamic information server 204 of FIG. 2) to obtain additional information to be used in determining a level of haptic feedback, process received data in a particular manner to determine a level of haptic feedback, and/or use contextual information known to the mobile device 104 (e.g., universal time, local time, location of the mobile device 104, user preferences) to determine a level of haptic feedback. If the information does not include instructions (block 408), the processor 302 executes default instructions to determine a level of haptic feedback based on the received information and the received goal condition (block 410). Example default instructions include invoking an application associated with the host device 106 and installed on the mobile device 104 to determine a level of haptic feedback, evaluating the received information in combination with a local time and/or location of the mobile device 104, and/or obtaining additional information from a dynamic information server (e.g., the dynamic information server 204).

If, on the other hand, the information includes instructions (block 408), the processor 302 executes the received instructions to determine a level of haptic feedback based on the received information and goal condition (block 412). For example, the processor 302 may execute instructions received from the host device 106 and stored in the memory 306 to perform functions specific to the host device 106. In this way, operators of host devices 106, 108, 110, 112, and 114 may facilitate customize user interactions with advertisements, locations, products, and/or services. In some examples, processor 302 executes the received instructions to determine the level of haptic feedback based on the local time, the location of the mobile device 104, user preferences, and/or any other contextual information available to and/or retrievable by the mobile device 104.

The example mobile device 104 (e.g., via the haptic actuator 314) imposes a haptic effect based on the level of haptic feedback determined from executing the default instructions (block 410) and/or the received instructions (block 412). For example, high levels of haptic feedback determined by the processor 302 may cause the example haptic actuator 314 to impose relatively strong haptic effects (e.g., vibrations) on the mobile device 104 (e.g., >50% of maximum strength, >75% of maximum strength, >90% of maximum strength, or any other strength threshold), relatively long vibrations (e.g., >1 second) of the mobile device 104, and/or more numerous vibrations of the mobile device (e.g., 3, 4, 5, or more discrete, successive vibrations of the mobile device 104). An example low level of haptic feedback determined by the processor 302 may cause the example haptic actuator 314 to impose relatively weak haptic effects (e.g., vibrations) on the mobile device 104 (e.g., <50% of maximum strength, <25% of maximum strength, <10% of maximum strength, or any other strength threshold), relatively short vibrations (e.g., <0.1 seconds, <0.5 seconds) of the mobile device 104, and/or one or few vibrations of the mobile device (e.g., one or two discrete, successive vibrations of the mobile device 104). In some examples, the processor 302 may also select from one or more intermediate levels of haptic feedback to cause the example haptic actuator 314 to impose intermediate haptic effects on the mobile device 104 (e.g., 40% of maximum strength, 50% of maximum strength, 60% of maximum strength, or any other strength threshold), intermediate-length vibrations (e.g., 0.4 seconds, 0.5 seconds, 0.6 seconds, etc.) of the mobile device 104, and/or an intermediate number of vibrations of the mobile device (e.g., 2-4 discrete, successive vibrations of the mobile device 104). While examples of strong, weak, and intermediate haptic effects are described herein, the examples are not intended to be limiting or suggestive and any other strengths, lengths, and/or numbers of haptic effects may be used to correspond to strong, weak, and/or intermediate haptic levels.

The example process 400 may then end and/or iterate to determine another level of haptic feedback. In some examples, the process 400 is implemented multiple times to guide a user to an object, location, service, or other goal condition using different haptic feedback levels to indicate to the user of the mobile device 104 a status relative to the goal condition.

Figure 5:
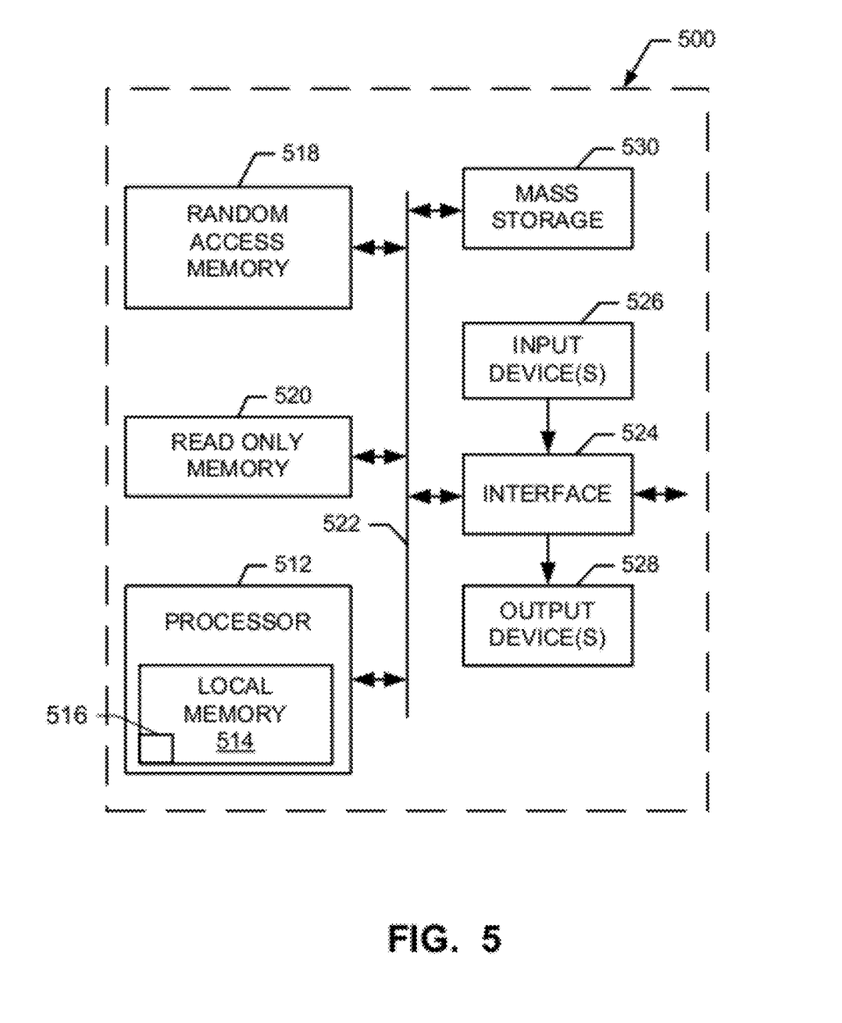
FIG. 5 is a block diagram of example hardware and software that may be used to implement the block diagrams and processes described above.

FIG. 5 is a block diagram of an example processing system 500 capable of implementing the apparatus and methods disclosed herein. The processing system 500 can correspond to, for example, a mobile device, an access control system, or any other type of computing device.

The system 500 of the instant example includes a processor 512 such as a general purpose programmable processor, an embedded processor, a microcontroller, etc. The processor 512 includes a local memory 514, and executes coded instructions 516 present in the local memory 514 and/or in another memory device. The processor 512 may execute, among other things, machine readable instructions to implement any, some or all of the processes represented in FIG. 4. The processor 512 may be any type of processing unit, such as one or more microprocessors from the Intel® Centrino® family of microprocessors, the Intel® Pentium® family of microprocessors, the Intel® Itanium® family of microprocessors, and/ or the Intel® XScale® family of processors, one or more microcontrollers from the ARM® family of microcontrollers, the PICO family of microcontrollers, etc. Of course, other processors from other families are also appropriate.

The processor 512 is in communication with a main memory including a volatile memory 518 and a non-volatile memory 520 via a bus 522. The volatile memory 518 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 520 may be implemented by flash memory and/or any other desired type of memory device. Access to the main memory 518, 520 is typically controlled by a memory controller (not shown).

The system 500 also includes an interface circuit 524. The interface circuit 524 may be implemented by any type of interface standard, such as an Ethernet interface, a universal serial bus (USB), and/or a third generation input/output (3GIO) interface.

One or more input devices 526 are connected to the interface circuit 524. The input device(s) 526 permit a user to enter data and commands into the processor 512. The input device(s) can be implemented by, for example, a keyboard, a mouse, a touchscreen, a track-pad, a trackball, an isopoint and/or a voice recognition system.

One or more output devices 528 are also connected to the interface circuit 524. The output devices 528 can be implemented, for example, by display devices (e.g., a liquid crystal display, a cathode ray tube display (CRT)), by a printer and/or by speakers. The interface circuit 524, thus, typically includes a graphics driver card.

The interface circuit 524 also includes a communication device such as a modem or network interface card to facilitate exchange of data with external computers via a network (e.g., an Ethernet connection, a digital subscriber line (DSL), a telephone line, coaxial cable, a cellular telephone system such as an EGPRS-compliant system, etc.).

The system 500 also includes one or more mass storage devices 530 for storing software and data. Examples of such mass storage devices 530 include floppy disk drives, hard drive disks, compact disk drives and digital versatile disk (DVD) drives.

As an alternative to implementing the methods and/or apparatus described herein in a system such as shown in FIG. 5, the methods and or apparatus described herein may be embedded in a structure such as a processor and/or an ASIC (application specific integrated circuit).

In some example embodiments, providing haptic feedback includes utilizing the output device 528 to provide feedback. For example, the output device 528 can display a notification to help guide a user of the mobile device to the desired resource. For example, if the mobile device is being moved closer to the desired resource then the output device 528 can display a green colored notification to indicate to the user that the mobile device is being moved closer to the desired resource. Similarly, if the mobile device is being moved away from the desired resource then the output device 528 can display a red colored notification to indicate to the user that the mobile device is being moved farther away from the desired resource.

In some example embodiments, providing haptic feedback includes utilizing the output device 528 to generate audible sounds to help guide a user of the mobile device to the desired resource. For example, if the mobile device is being moved closer to the desired resource then the output device 528 can generate a soft or low volume audible sound to indicate to the user that the mobile device is being moved closer to the desired resource. Similarly, if the mobile device is being moved away from the desired resource then the output device 528 can display a loud or high volume audible sound to indicate to the user that the mobile device is being moved farther away from the desired resource.

Further, although the example processes are described with reference to flowcharts, many other techniques for implementing the example methods and apparatus described herein may alternatively be used. For example, with reference to the flowcharts, the order of execution of the blocks may be changed, and/or some of the blocks described may be changed, eliminated, combined, and/or subdivided into multiple blocks. Any of the described blocks may be as implemented as part of an existing system. While the example block diagrams are described as implementing the processes of the flowcharts, the apparatus of the block diagrams may implement any process and, likewise, the processes of the flowcharts may be implemented by any apparatus, device, system, software, or combination thereof.

Finally, although certain example methods, apparatus and articles of manufacture have been described herein, the scope of coverage of this disclosure is not limited thereto. On the contrary, this disclosure covers all methods, apparatus and articles of manufacture and equivalents described and claimed herein.

What is claimed is:

1. A method comprising:
receiving a goal condition at a mobile device;
requesting information from a host device using a first close-proximity communication;
receiving the information from the host device at the mobile device using a second close-proximity communication, wherein the information received at the mobile device comprises instructions and data, the data associating a characteristic of the host device with the goal condition;
executing the instructions to process the data and the goal condition to determine a level of haptic feedback; and
causing a haptic effect on the mobile device based on the level of haptic feedback.

2. The method of claim 1, wherein the host device is associated with at least one of an advertisement, a book, or a map.

3. The method of claim 1, wherein determining the level of haptic feedback comprises determining a status relative to the goal condition.

4. The method of claim 3, wherein the level of haptic feedback is higher when the status is closer to the goal condition.

5. The method of claim 1, wherein determining the level of haptic feedback comprises determining at least one of a number of discrete haptic effects, a strength of the haptic effect, or a length of the haptic effect.

6. The method of claim 1, wherein the instructions further comprise instructions for causing the mobile device to request from a server information related to the host device.

7. The method of claim 6, wherein the instructions further comprise instructions for causing the mobile device to provide context information to the server.

8. The method of claim 1, wherein said determining the level of haptic feedback is based on context information.

9. The method of claim 8, wherein the context information comprises at least one of a universal time, a local time of the mobile device, a location of the mobile device, or a user preference.

10. The method of claim 1, wherein the mobile device comprises a smartphone.

11. The method of claim 1, wherein at least one of the first and second close-proximity communications comprise near-field communications.

12. A mobile device, comprising:
   a processor;
   a memory coupled with the processor, the memory storing machine readable instructions which, when executed by the processor, cause the processor to:
   receive a goal condition;
   request information from a host device using a first close-proximity communication;
   receive the information from the host device at the mobile device using a second close-proximity communication, wherein the information received at the mobile device comprises instructions and data, the data associating a characteristic of the host device with the goal condition; and
   execute the instructions to process the data and the goal condition to determine a level of haptic feedback; and
   a haptic actuator to cause a haptic effect on the mobile device based on the level of haptic feedback.

13. The mobile device of claim 12, wherein the memory stores machine readable instructions to cause the processor to determine the level of haptic feedback based on a status relative to the goal condition.

14. The mobile device of claim 12, wherein the memory stores machine readable instructions to cause the processor to determine the level of haptic feedback based on contextual information available to the processor.

15. The mobile device of claim 14, wherein the context information comprises at least one of a universal time, a local time of the mobile device, a location of the mobile device, or a user preference.

16. A system, comprising:
   a host device to provide first information to a requesting device via a close-proximity communication, the first information comprising first instructions to cause the requesting device to process the first information to determine a first level of haptic feedback; and
   an update server to provide updated information to the host device, the updated information comprising second instructions to cause the requesting device to process the updated information to determine a second level of haptic feedback.

17. The system of claim 16, further comprising a dynamic information server to provide dynamic information to the requesting device, wherein the first instructions comprise least one of a location or address to the requesting device with the first information.

18. The system of claim 17, wherein the host device is to provide first instructions to the requesting device to request information from the dynamic information server.

19. A method comprising:
   requesting information from a host device using a first close-proximity communication;
   receiving the information from the host device at a mobile device using a second close-proximity communication, the information comprising first instructions and data the data associating a characteristic of the host device with a goal condition;
   executing the instructions to process the first information to determine a level of haptic feedback based on the data and at least one of a time, a location of the mobile device, or user preference; and
   imposing a haptic effect on the mobile device based on the level of haptic feedback.

* * * * *